May 13, 1969   N. MOSS   3,443,792
GAS-TURBINE ROTORS
Filed Sept. 26, 1967

United States Patent Office 3,443,792
Patented May 13, 1969

3,443,792
GAS-TURBINE ROTORS
Norman Moss, Ilford, England, assignor to The Plessey Company Limited, Ilford, England, a British company
Filed Sept. 26, 1967, Ser. No. 670,664
Claims priority, application Great Britain, Oct. 1, 1966, 43,952/66
Int. Cl. F01d 5/08, 5/18, 5/14
U.S. Cl. 253—77                    4 Claims

ABSTRACT OF THE DISCLOSURE

The rotor blades of a gas turbine are made of ceramic material and are secured to the circumference of a turbine disc made of steel by steel pins screwed into the disc and extending radially through each blade and having at their outer ends a head accommodated in a recess of the ceramic material.

---

Figure 1:
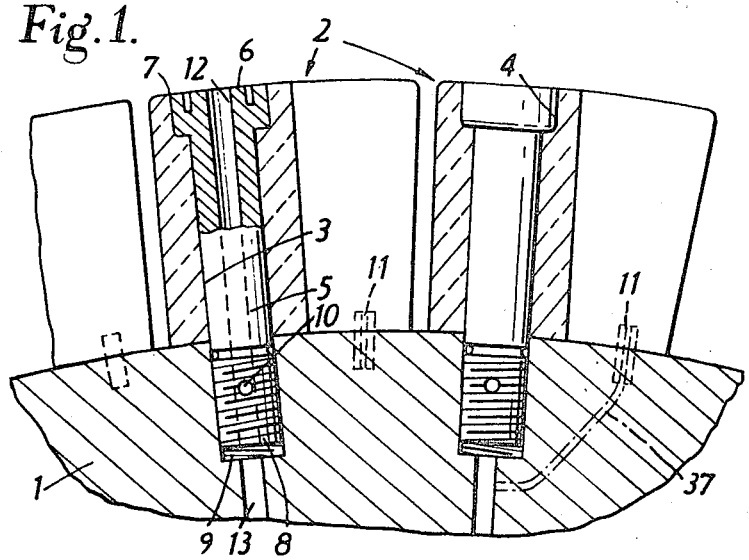

The present invention relates to gas-turbine rotors and has for an object to provide an improved rotor suitable for use at very high gas temperatures.

As is well known, the thermodynamic efficiency and useful work output of a gas turbine engine increases with the entry temperature of the actuating gas, and efforts have therefore been made to provide gas-turbine rotors in which the blades are made of a material capable of resisting temperatures higher than those which the usual alloy-steel blades can stand, even when air cooling is employed within limits set by windage and heat losses. In this connection attention has already been directed to the fact that some ceramics have outstanding thermoshock resistance, but while in the case of nozzle blades of gas turbines the difficulties in employing ceramics have been sufficiently overcome to make the use of ceramics a practical possibility, the high dynamic forces occurring in the rotor have hitherto made the use of ceramic materials for the rotor blades of gas turbines impracticable. The present invention has therefore for a more specific object to provide an improved rotor construction equipped with ceramic rotor blades. According to the present invention rotor blades made of ceramic material are secured to a metallic rotor disc, made for example by steel, by pins of suitable metal, for example steel pins, which are screwed with one of their ends into the rotor disc to extend through each rotor blade in the radial direction of the rotor, and which are each provided with a head at the outer side of the blade to retain the blade against centrifugal forces without imposing major tensional stress on the material of the blade, this head being preferably accommodated in a matching recess of the ceramic blade, and air-passage means being provided in or on the metal pin to prevent it from reaching a temperature at which the metal strength becomes inadequate. Suitable means will generally be provided for ensuring the correct angular position of the blades in relation to the axial direction of the circumference of the turbine wheel. This can conveniently be achieved by the provision of dowel pins made of metal and projecting radially from the turbine wheel, at a distance from the pin securing the blade, into a suitable recess of the blade. The dowel pins may be secured in the turbine wheel by screw threads and may engage a matching socket bore in the inner end surface of the blade, or they may if desired engage two opposite side walls of a through passage in the blade, which may be a passage serving also the purpose of reducing the total weight of the blade, said passage having a cross section which may be many times that of the pin while nevertheless engaging the latter along two axially extending surface portions of the pin which are substantially diametrically opposite to each other, preferably along a diameter of the passage extending substantially through the axis of the attachment pin. An alternative solution would be to make the cross-section of the pin or of its head noncircular, for example by adopting an elliptical section or a basic circle having a keyway extension.

While a variety of refractory ceramic materials may be used for the blades, for example sintered molybdenum disilicide, it is preferred to choose a ceramic material of low density in order to relieve the load on the pin, and from this point of view the use of a suitable silicon nitride composition may be chosen. Although at present those silicon nitride compositions which have a very low density, tend to be friable, in the Allen-Clark Research Laboratories of The Plessey Company Limited a silicon nitride of high structural density and uniform quality has been achieved which offers qualities making the use of this material, or of a material developed therefrom, appear desirable in connection with the present invention. Since the full centrifugal load of the blade is taken up by the head of the pin, the fit between this head and the recess of the blade in which the head is accommodated, must be of good quality to prevent concentration of the load. This might be ensured by grouting the joint with a high-temperature-resistant cement.

Figure 2:
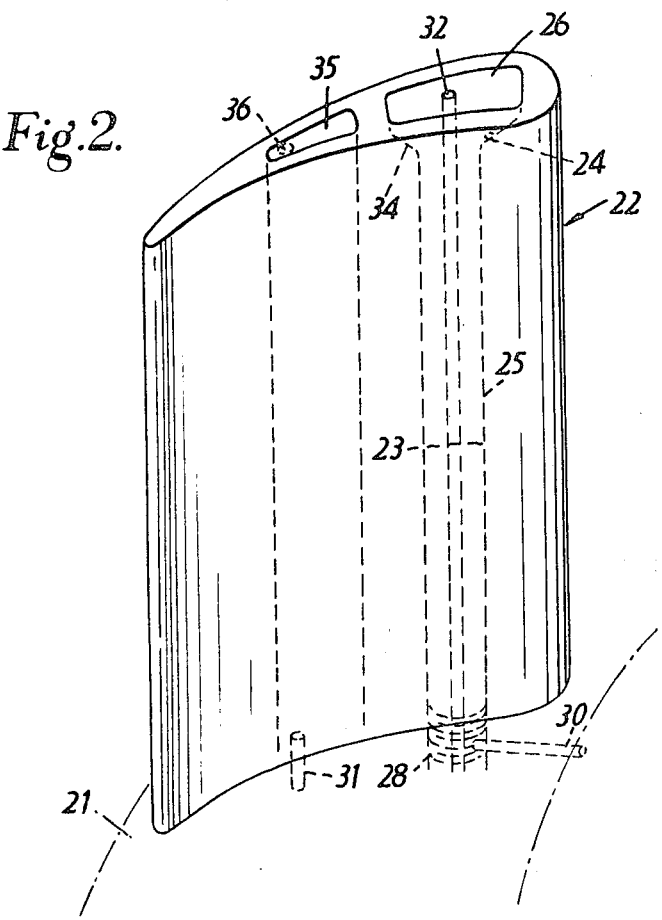

In order that the invention may be more readily understood, two embodiments thereof will now be described in more detail with reference to the accompanying drawings, in which:

FIGURE 1 shows part of a turbine wheel equipped with blades in accordance with the present invention, in a section at right angles to the axis of the wheel, and FIGURE 2 is a perspective view of part of a turbine wheel disc equipped with a modified form of construction of blades.

Referring now first to FIGURE 1, a turbine rotor disc 1 made of steel is fitted with blades 2 made of refractory ceramic material of reasonable mechanical strength, for example of molybdenum disilicide or preferably of suitable silicon-nitride material. Each blade has, near the thicker end of its profile, a through bore 3 extending throughout the axial length of the blade and widened at its outer end by a concentric counter-bore or socket recess 4. Each blade is secured to the rotor disc 1 by a pin 5 having a head 6 which is a good fit in the socket recess 4; this fit may be improved by grouting with refractory cement 7. The other end of the pin 5 is formed with screw threads 8 which engage a similarly screw-threaded socket bore 9 of the rotor disc 1. After the pin 5 has been screwed home to secure the blade 2, it is preferably secured against loosening under vibration by inserting a cross pin 10 into a suitable bore extending from one side of the rotor disc 1 and an aligned socket bore in one side of the screw-threaded portion 8. Pivoting of each blade 2 about its attachment pin 5 is prevented by a dowel pin 11 which is secured in a socket bore in the circumference of the wheel disc 1 and engages an aligned socket bore provided at the adjacent end of the blade, at a distance from the pin 5.

While the external surfaces of the turbine blades 2 will assume a very high temperature in operation of the turbine, the ceramic material employed is preferably one having good heat-insulating qualities, so that only moderate cooling of the steel pins 5 is required to keep the latter at a temperature at which their mechanical strength remains adequate. This cooling is effected by blowing air through axial passages 12 which extend along the axis of each pin from end to end thereof, and which communicate with suitable air-admission passages 13 in the turbine wheel disc 1. Similar cooling arrangements, diagrammatically indicated at 37 may be provided in connection with the dowel pins 11.

FIGURE 2 illustrates a modified embodiment of the invention, in which parts corresponding to FIGURE 1 are indicated by the same references increased by 20. Features by which the construction of FIGURE 2 differs from that of FIGURE 1, comprise the use on each pin 25 of a head 26 of elongated profile. This feature not only permits the use of the invention in the case of blades which are too thin at their leading end for the accommodation of a round head 6 of sufficient area, but it may also be utilised for preventing the blade from turning about the axis of the pin 25. The recess 24 accommodating the head 26 may in this case be limited in the transverse direction to the width of the stem of pin 25 and may have inclined bottom surfaces 34 at its ends instead of being flat-bottomed in the manner shown in the case of the recess 4 in FIGURE 1. The angle of inclination of the surfaces 34 is preferably smaller than the friction angle between the respective materials of blade 23 and pin 26 to prevent the centrifugal force of the blades from producing tensile stress in the material of the blades.

The construction of FIGURE 2 further shows a lightening hole 35 extending, throughout the radial length of the blade, parallel to the bore 23 which accommodates the pin 25. Part of the wall of this hole 35 may be arranged to cooperate with a dowel pin 31, which in this case must be inserted after the pin 25 has been screwed home, but which is otherwise similar in function to the dowel pins 11 in FIGURE 1 except that it forms contact with the walls of the hole 35 only along two approximately diametrically opposite part of the circumference of the pin, as shown diagrammatically at 36 at the outer end of the blade while in fact the pin 31, as indicated in the drawing, is arranged in a corresponding position at the inner end of the blade, adjacent to the circumference of the wheel disc 21.

I claim:
1. A gas-turbine rotor comprising a metallic rotor disc, a plurality of ceramic rotor blades arranged at the circumference of the said disc in circumferentially spaced relation, each blade having a through passage extending radially of the rotor, and a plurality of blade-supporting metal pins, one for each blade, each said pin having an enlarged-diameter head at one end and being formed with external screw threads at its other end, the disc having at its circumference screw-threaded radial bores each aligned with one of said through passages, each said pin having its screw threads engaged in one of said bores so as to fit the pin to extend along the through passage of one of said blades with the head of the pin in supporting contact with the blade, and the rotor being provided with passages for conducting cooling fluid along each said pin.

2. A gas turbine rotor as claimed in claim 1, wherein the head of each metal pin is accommodated in a matching recess of the ceramic blade.

3. A gas turbine rotor as claimed in claim 1, wherein the correct angular position of the blades in relation to the axial direction of the circumference of the rotor disc is ensured by dowel pins made of metal and projecting radially from the rotor disc, at a distance from the pin securing the blade, into recesses of the blade.

4. A gas-turbine rotor as claimed in claim 3, wherein each blade has, for cooperation with such dowel pin, a recess constituted by a further through passage which extends radially of the rotor and which has an elongated cross-section so as to make contact with the dowel pin at two points of the circumference of said further passage, which points are spaced across the thickness of the blade, while leaving part of the cross section of said further passage available for the conduction of a cooling fluid.

References Cited
UNITED STATES PATENTS

| | | |
|---|---|---|
| 649,014 | 5/1900 | Terry. |
| 2,479,057 | 8/1949 | Bodger. |
| 3,163,397 | 12/1964 | Gassmann et al. |
| 3,219,314 | 11/1965 | Petrie. |
| 3,271,004 | 9/1966 | Smuland. |

FOREIGN PATENTS

| | | |
|---|---|---|
| 724,793 | 9/1942 | Germany. |
| 367,265 | 2/1932 | Great Britain. |
| 238,005 | 9/1945 | Switzerland. |

EVERETTE A. POWELL, Jr., Primary Examiner.

U.S. Cl. X.R.

253—39.15